Patented Mar. 6, 1945

2,370,756

UNITED STATES PATENT OFFICE 2,370,756

SULPHIDES OF DIALKYL PHENOLS

Robert L. Sibley, Nitro, W. Va., assignor to Monsanto Chemical Company, St. Louis, Mo., a corporation of Delaware No Drawing. Application June 9, 1942, Serial No. 446,381

4 Claims. (Cl. 260—609)

The present invention relates to a new class of chemical compounds. More particularly, the present invention relates to a new class of phenolic sulphides. The new compounds are useful as oxidation inhibitors and are especially useful in rubber and mineral oils.

The new compounds are the sulphides of dialkyl monohydric phenols in which at least one of the alkyl groups contains a plurality of carbon atoms and in which the two positions ortho to the hydroxy group are unsubstituted except for sulphur. It is known that phenols unsubstituted in the aromatic ring except for the phenolic hydroxy group, undergo reaction with sulphur halides to form phenolic sulphides in which a sulphur atom is attached to a ring carbon atom. While some substituted phenols undergo a similar reaction, in general, they give uncertain results and many have been reported as inactive. However, it has been found in accordance with the present invention that monohydric phenols unsubstituted in the 2 and 6 positions but containing two alkyl groups at least one of which contains a plurality of carbon atoms react with sulphur halides to produce valuable products. After reacting or attempting to react a large number of substituted phenols, it has been concluded that other groups must be absent. Phenols containing additional alkyl groups or different substituting groups either failed to react or produced inferior products.

The new compounds can be prepared most easily and cheaply, it is believed, by the action of sulphur monochloride ($S_2Cl_2$) or sulphur dichloride ($SCl_2$) on the dialkyl phenol. However, where convenient or desirable other methods of synthesis may be used. Other sulphur halides as for example sulphur bromide may be substituted for the sulphur chloride. It may be pointed out that since more than one position is available at which the sulphur may attach to the ring, more than a single reaction product may be formed and it is within the purview of this invention to prepare the composite reaction products which may then be used directly as oxidation inhibitors or age resistors. In this connection attention is directed to the fact that in naming the new compounds the position of the sulphur being unknown is not specified. Accordingly, although the compounds hereinafter mentioned are called sulphides, the positions of the substituting groups are based on the phenols from which the sulphides may be derived.

Typical examples of the new class of compounds comprise di(1-hydroxy 3-methyl 4-tertiary butyl phenyl) monosulphide and disulphide, di(1-hydroxy 3-methyl 4 isopropyl phenyl) monosulphide and disulphide, di(1-hydroxy 3-methyl 4 tertiary amyl phenyl) monosulphide and disulphide, di(1-hydroxy 3-tertiary butyl 4-methyl phenyl) monosulphide and disulphide, di(1-hydroxy 3-isopropyl 4-methyl phenyl) monosulphide and disulphide, di(1-hydroxy 3-methyl 4-secondary butyl phenyl) monosulphide and disulphide, di(1-hydroxy 3-methyl 4-isoamyl phenyl) monosulphide and disulphide, di(1-hydroxy 3,5-ditertiary butyl phenyl) monosulphide and disulphide, di(1-hydroxy 3,5-ditertiary amyl phenyl) monosulphide and disulphide, di(1-hydroxy 3-methyl 5-isopropyl phenyl) monosulphide and disulphide, di(1-hydroxy 3-methyl 5-tertiary butyl phenyl) monosulphide and disulphide and di(1-hydroxy 3-methyl 5-tertiary amyl phenyl) monosulphide and disulphide.

The following is a specific example of the invention illustrative thereof but not limitative of the invention.

Example

Substantially 55 parts of 4 tertiary butyl meta cresol was dissolved in substantially 375 parts by weight of carbon tetrachloride. A solution of substantially 19 parts by weight of $SCl_2$ in substantially 150 parts by weight of carbon tetrachloride was slowly added to the solution of the dialkyl phenol. The sulphur chloride was quickly disseminated throughout the reaction mixture by means of an efficient stirring mechanism and the mixture kept at 20°–30° C. during the addition. The reaction was instantaneous and took place with little evolution of heat. Stirring was continued for a short time after the addition of sulphur chloride and the reaction mixture cooled to 5° C. and filtered. A white crystalline product believed to be di(1-hydroxy 3-methyl 4-tertiary butyl phenyl) monosulphide, $$(CH_3)_3C-\underset{OH}{\underset{|}{\overset{CH_3}{\underset{|}{C_6H_2}}}}-S-\underset{OH}{\underset{|}{\overset{CH_3}{\underset{|}{C_6H_2}}}}-C(CH_3)_3$$

was obtained, M. P. 157–158° C.

Another preparation similar to the above was carried out except that instead of cooling and filtering at the end of the reaction the solvent was removed by evaporation. In this manner a pale amber colored resin melting below 100° C. was obtained. As an age resistor for rubber this resin was only slightly inferior to the crystalline product mentioned above.

This invention is not limited to the specific compounds mentioned above nor to the particular process described. For example other solvents may be used and other means of effecting reaction. The present invention is limited solely by the claims attached hereto as part of the present invention.

What is claimed is:

1. A monosulphide of a 3 methyl 4 alkyl monohydric phenol having the formula

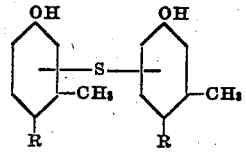

where R represents an alkyl group containing more than two but less than six carbon atoms.

2. A monosulphide of a 3 methyl 4 alkyl monohydric phenol having the formula

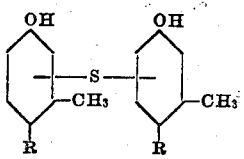

where R represents a tertiary alkyl group containing less than six carbon atoms.

3. A monosulphide of 3-methyl 4-tertiary butyl phenol having the formula

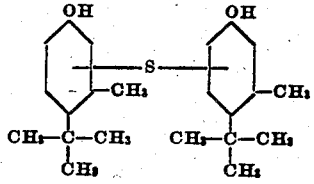

4. A monosulphide of a 3,4 dialkyl monohydric phenol having the formula

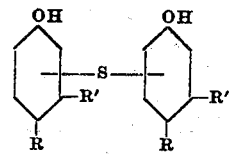

where R represents an alkyl group containing more than two but less than six carbon atoms and R' is a short chain alkyl group.

ROBERT L. SIBLEY.